C. F. BEAUFRERE.
SKIMMING SPOON.
APPLICATION FILED FEB. 27, 1919.

1,337,814.

Patented Apr. 20, 1920.

WITNESSES
Frank C. Palmer.

INVENTOR
Charles F. Beaufrere,
BY
ATTORNEYS

UNITED STATES PATENT OFFICE.

CHARLES F. BEAUFRERE, OF CENTRAL ISLIP, NEW YORK.

SKIMMING-SPOON.

1,337,814.  Specification of Letters Patent.  Patented Apr. 20, 1920.

Application filed February 27, 1919. Serial No. 279,657.

*To all whom it may concern:*

Be it known that I, CHARLES F. BEAUFRERE, a citizen of the United States, and a resident of Central Islip, in the county of Suffolk and State of New York, have made certain new and useful Improvements in Skimming-Spoons, of which the following is a specification.

My present invention relates generally to skimming devices and more particularly to a device for removing one of two liquids of different specific gravities which though together, are not chemically mixed, my object being the provision of a simple, inexpensive device for this purpose which may be readily manufactured of material having a known specific gravity greater than one of the liquids but less than that of the other liquid.

Generally speaking, my invention proposes for this purpose a spoon-shaped utensil as lending itself to ready manufacture from a great variety of materials, which will bring its specific gravity to the desired point, the utensil of this shape having notches or recesses in the edge of its bowl, for a purpose which will be presently described.

In the accompanying drawings illustrating my present invention, and forming a part of this specification:—

Figure 2:
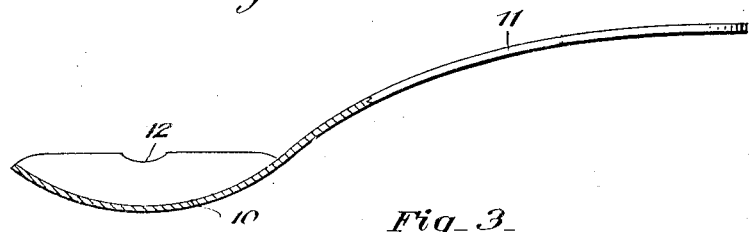
Fig. 2 is a sectional side view of my improved skimmer.
Figure 3:
Fig. 3 is a plan view thereof.

Referring now to these figures, and as particularly seen in Figs. 2 and 3, my invention proposes a skimming device which is generally spoon-shaped, with a bowl 10 and handle 11 as this shape lends itself to very convenient, ready manufacture from a great number of different materials, such as for instance hard rubber, metal alloys and other materials, capable of producing a specific gravity between that of the two liquids to be separated. The bowl 10 of the skimmer differs in construction from that of the conventional domestic spoon by the presence of side notches, recesses and the like 12 provided in its edge, and preferably located at diametrically opposite points to balance its action in taking in one of the liquids to the full depth thereof as the spoon is supported by the other liquid.

Figure 1:
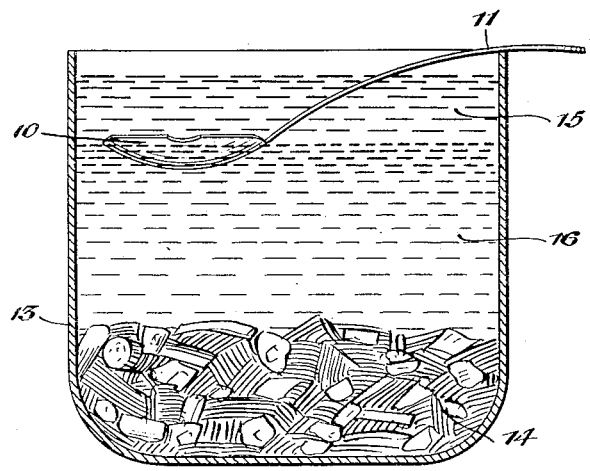
Figure 1 is a sectional view illustrating the practical application of my invention.

Thus, referring to Fig. 1, I have shown by way of practical application, a vessel 13 wherein liquid with solids has been allowed to settle, during which the heavier solids 14 have collected on the bottom while the fats 15, for instance olive oil having a specific gravity of .98, have collected above the water content 16 seen between the fats 15 and the solids 14 and having a specific gravity of 1.00. With the skimmer formed of a material having a specific gravity greater than that of the fats 15, but less than that of the water content 16, as for instance porous carbon worked with a suitable binder to specific gravity of .99, it is obvious the bowl 10 will sink through the fats but will float on the water content 16 in the position shown in Fig. 1, so that with the side notches or recesses, the entire fats may be readily, quickly and effectively removed.

It is also obvious such a utensil will have an extensive and varied use in hospitals and restaurants as well as in the household.

I claim:—

1. A skimming utensil for removing one liquid from another of greater specific gravity, consisting of a spoon shaped implement formed of a material having a specific gravity between that of the two liquids, provided with means to take in liquid to a level below the plane of its edge.

2. A skimming utensil for removing one liquid from another of greater specific gravity, consisting of a spoon-shaped implement formed of a material having a specific gravity between that of the two liquids and including a handle and a bowl, the latter provided with recesses in its edge, for the purpose described.

3. A skimming utensil for removing one liquid from another of greater specific gravity, comprising a bowl portion and having a specific gravity between that of the two liquids.

CHARLES F. BEAUFRERE.